(12) United States Patent
Hosseini et al.

(10) Patent No.: US 12,207,247 B2
(45) Date of Patent: Jan. 21, 2025

(54) SIDELINK AND UPLINK PRIORITIZATION

(71) Applicant: QUALCOMM Incorporated, San Diego, CA (US)

(72) Inventors: Seyedkianoush Hosseini, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 17/449,619

(22) Filed: Sep. 30, 2021

(65) Prior Publication Data

US 2023/0098875 A1    Mar. 30, 2023

(51) Int. Cl.
| | | |
|---|---|---|
| *H04W 72/12* | (2023.01) | |
| *H04W 72/1263* | (2023.01) | |
| *H04W 72/566* | (2023.01) | |
| *H04W 92/18* | (2009.01) | |

(52) U.S. Cl.
CPC ..... *H04W 72/1263* (2013.01); *H04W 72/566* (2023.01); *H04W 92/18* (2013.01)

(58) Field of Classification Search
CPC ..... H04L 1/001; H04L 5/0044; H04L 1/1887; H04L 5/0064; H04W 72/56; H04W 52/281

See application file for complete search history.

(56) References Cited

U.S. PATENT DOCUMENTS

| | | | | |
|---|---|---|---|---|
| 2022/0264590 A1* | 8/2022 | Han | ..................... | H04L 1/1854 |
| 2022/0279537 A1* | 9/2022 | Freda | ................. | H04W 72/569 |
| 2022/0377761 A1 | 11/2022 | Lee et al. | | |
| 2023/0164768 A1* | 5/2023 | Park | ..................... | H04W 76/28 370/329 |

FOREIGN PATENT DOCUMENTS

WO    2021071234 A1    4/2021

OTHER PUBLICATIONS

Intel Corporation: "Sidelink in-device Coexistence Solutions", R1-1910652, Intel—EV2X_COEX, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, XP051809172, 8 Pages, The Whole Document.
International Search Report and Written Opinion—PCT/US2022/042337—ISA/EPO—Dec. 12, 2022.

* cited by examiner

*Primary Examiner* — Romani Ohri
(74) *Attorney, Agent, or Firm* — Procopio, Cory, Hargreaves & Savitch LLP

(57) ABSTRACT

A method and apparatus for prioritization of sidelink and uplink. The apparatus compares priorities of a first group of transmission signals to determine a first signal from the first group of transmission signals having a highest priority. The first group of transmission signals comprise at least one uplink signal and at least one sidelink transmission signal. The apparatus compares a priority of the first signal from the first group of transmission signals against a reception signal having a highest priority of a second group of reception signals to determine to transmit at least the first signal from the first group of transmission signals or to receive at least one reception signal from the second group of reception signals. The second group of reception signals comprises at least one sidelink reception signal.

25 Claims, 11 Drawing Sheets

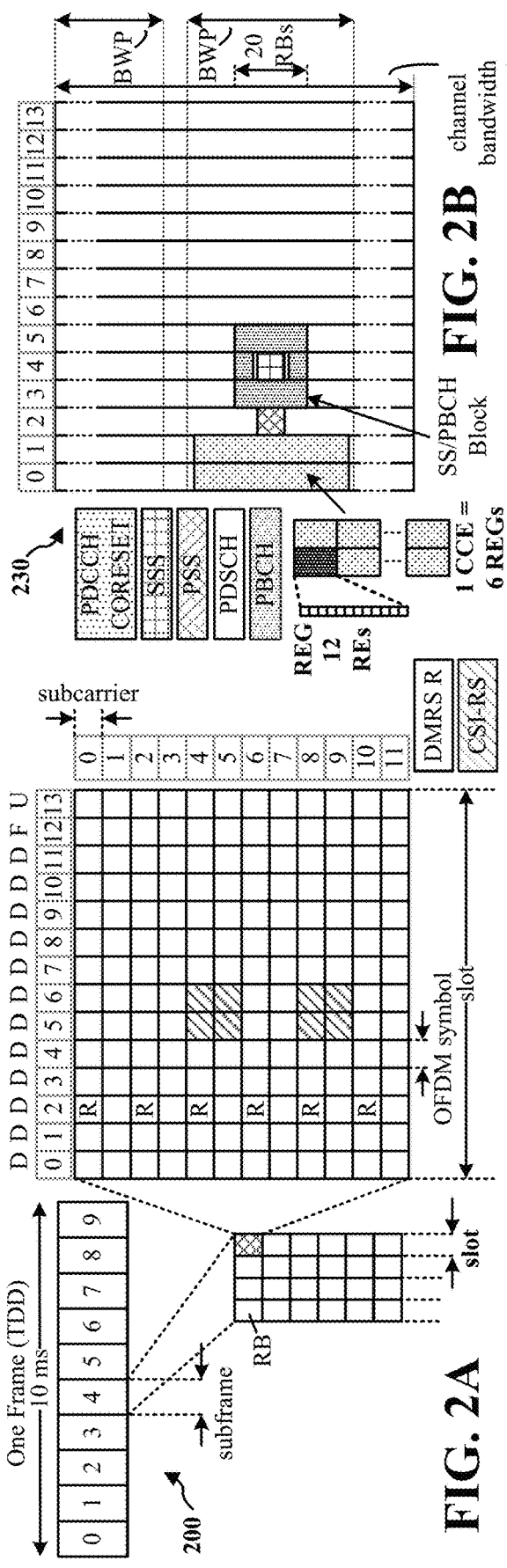
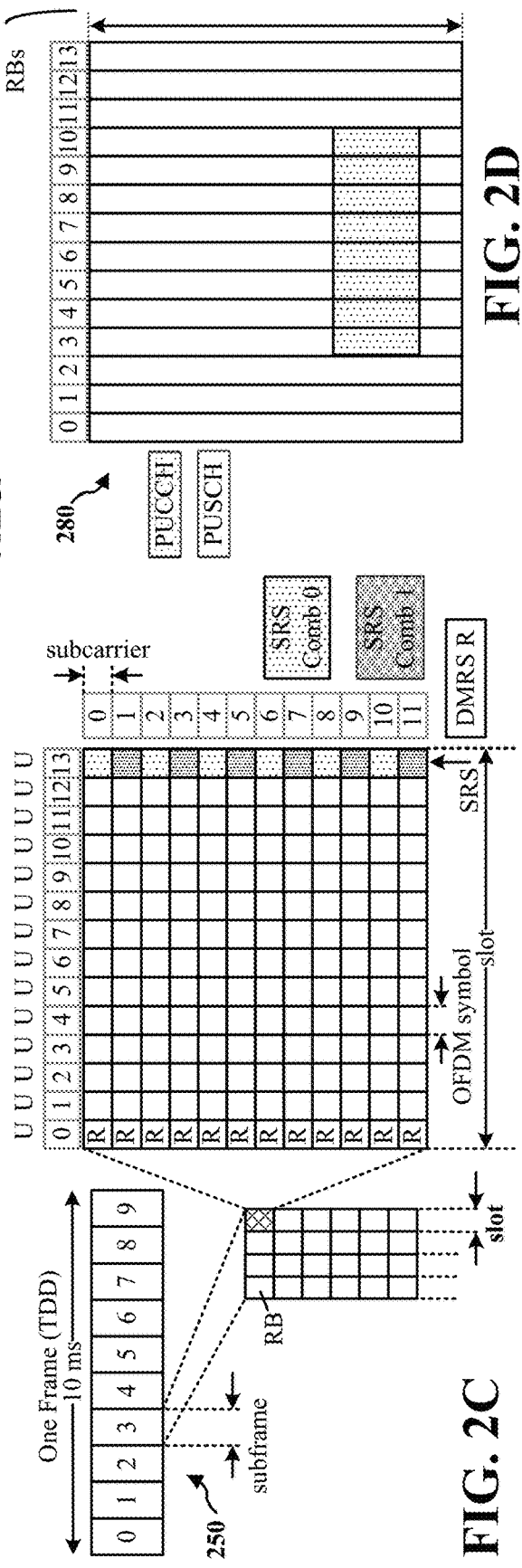
FIG. 2A
FIG. 2B
FIG. 2C
FIG. 2D

| Uu Priority Index |
|---|
| 1 |
| 0 |

510

| SL Priority Index |
|---|
| 1 |
| 2 |
| 3 |
| 4 |
| 5 |
| 6 |
| 7 |
| 8 |

# SIDELINK AND UPLINK PRIORITIZATION

TECHNICAL FIELD

The present disclosure relates generally to communication systems, and more particularly, to a configuration for prioritization of sidelink and uplink.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus compares priorities of a first group of transmission signals to determine a first signal from the first group of transmission signals having a highest priority. The first group of transmission signals comprise at least one uplink signal and at least one sidelink transmission signal. The apparatus compares a priority of the first signal from the first group of transmission signals against a reception signal having a highest priority of a second group of reception signals to determine to transmit at least the first signal from the first group of transmission signals or to receive at least one reception signal from the second group of reception signals. The second group of reception signals comprises at least one sidelink reception signal.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a schedule for the UE to transmit or receive a first group of transmission signals or a second group of reception signals. The schedule comprises priorities for each of the first group of transmission signals and the second group of reception signals. The apparatus receives, from the UE, an indication indicating transmission of a first signal from the first group of transmission signals based on a prioritization procedure performed at the UE. The first group of transmission signals comprise at least one uplink signal and at least one sidelink transmission signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 5 is a diagram illustrating an example of a priority index for sidelink and Uu communications.

DETAILED DESCRIPTION

Figure 1:
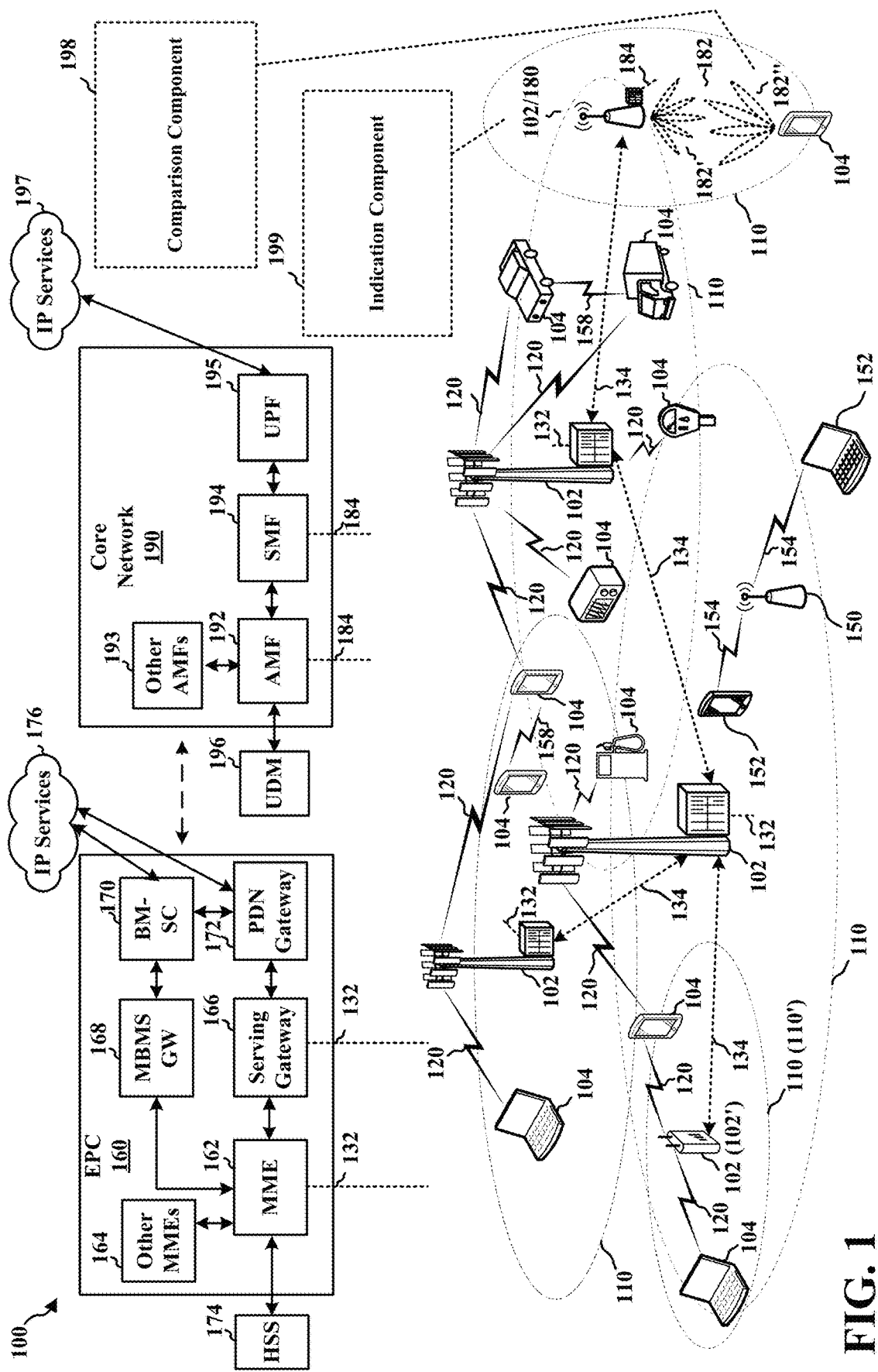
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), flash memory, phase change memory, optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to perform a prioritization procedure to determine to transmit or receive uplink or sidelink signals. For example, the UE 104 may comprise a comparison component 198 configured to perform a prioritization procedure to determine to transmit or receive uplink or sidelink signals. The UE 104 may compare priorities of a first group of transmission signals to determine a first signal from the first group of transmission signals having a highest priority. The first group of transmission signals comprise at least one uplink signal and at least one sidelink transmission signal. The UE 104 may compare a priority of the first signal from the first group of transmission signals against a reception signal having a highest priority of a second group of reception signals to determine to transmit at least the first signal from the first group of transmission signals or to receive at least one reception signal from the second group of reception signals. The second group of reception signals comprises at least one sidelink reception signal.

Referring again to FIG. 1, in certain aspects, the base station 180 may be configured to receive an uplink signal from a UE based on a prioritization procedure performed at the UE. For example, the base station 180 may comprise an indication component 199 configured to receive an uplink signal from a UE based on a prioritization procedure performed at the UE 104. The base station 180 may transmit, to a UE 104, a schedule for the UE to transmit or receive a first group of transmission signals or a second group of reception signals. The schedule comprises priorities for each of the first group of transmission signals and the second group of reception signals. The base station 180 may receive, from the UE 104, an indication indicating transmission of a first signal from the first group of transmission signals based on a prioritization procedure performed at the UE. The first group of transmission signals comprise at least one uplink signal and at least one sidelink transmission signal.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
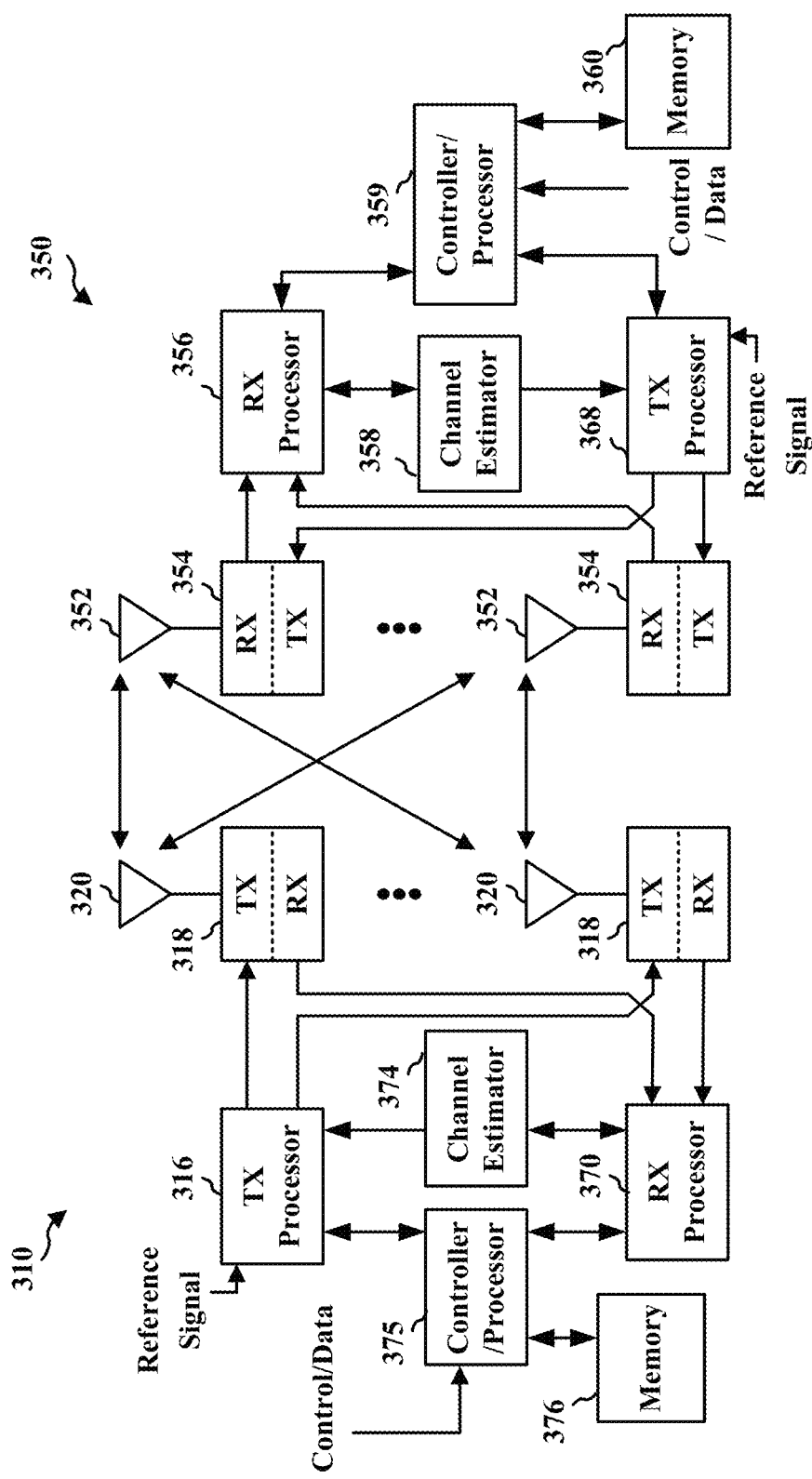
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
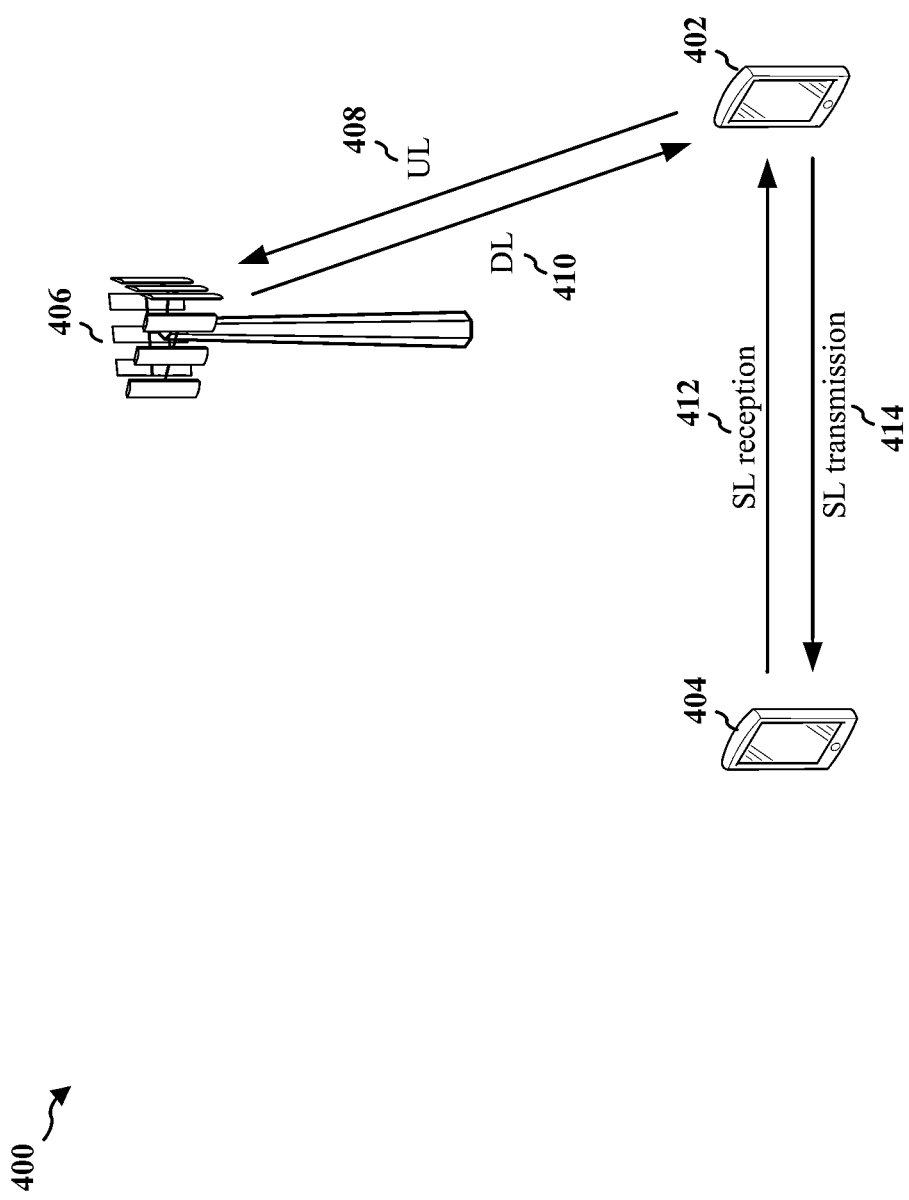
FIG. 4 is a diagram illustrating an example of a UE communicating with a base station and another UE.

In wireless communications, a UE may be configured to communicate with a base station by transmitting uplink (UL) signals or receiving downlink (DL) signals. The UE may also be configured to communicate with another UE via sidelink (SL). For example, with reference to the diagram 400 of FIG. 4, a first UE 402 may communicate with the base station 406 by transmitting uplink 408 or receiving downlink 410. The first UE 402 may communicate with a second UE 404 via sidelink by receiving a sidelink reception 412 or by transmitting a sidelink transmission 414.

Prioritization rules may indicate a priority between a sidelink transmission and an uplink transmission on the same and different component carriers, and for uplink transmission and sidelink reception. For example, if a UE may simultaneously transmit on the UL and on the SL of a serving cell, and is not capable of simultaneous transmissions on the UL and on the SL of the serving cell, then the UE may transmit on the link, UL or SL, with the higher priority. In some instances, if a UE may simultaneously transmit on the UL and receive on the SL in a carrier, the UE may transmit on UL or receives on SL, with the higher priority. In some instances, if a UE is capable of simultaneous transmissions on the UL and on the SL of two respective carriers of a serving cell, or of two respective serving cells, the UE may transmit on the UL and on the SL of the two respective carriers of the serving cell, or of the two respective serving cells. The transmission on the UL may overlap with the transmission on the SL over a time period, and the total UE transmission power over the time period may exceed $P_{CMAX}$. In such instances, the UE may reduce the power for the UL transmission prior to the start of the UL transmission, if the SL transmission has higher priority than the UL transmission, such that the total UE transmission power may not exceed $P_{CMAX}$. The UE may reduce the power for the SL transmission prior to the start of the SL transmission, if the UL transmission has higher priority than the SL transmission, such that the total UE transmission power may not exceed $P_{CMAX}$.

For Uu, UL channels may have one of the two physical layer priorities, high priority or low priority. However, for SL, SL transmissions or receptions may have 8 levels of priorities. In order to compare the two sets, a threshold may be defined. The value for this threshold may be based on whether the UL priority is high or low or not configured. For example, for prioritization between SL transmission or PSFCH/S-SS/PSBCH block reception and UL transmission other than a PRACH, or a PUSCH scheduled by an UL grant in a RAR and its retransmission, or a PUSCH corresponding to Type-2 random access procedure and its retransmission, or a PUCCH with sidelink HARQ-ACK information report, if the UL transmission is for a PUSCH or for a PUCCH with priority index 1 and if sl-PriorityThreshold-UL-URLLC is provided, then the SL transmission or reception has higher priority than the UL transmission if the priority value of the SL transmission(s) is smaller than sl-Priority Threshold-UL-URLLC; otherwise, the UL transmission has higher priority than the SL transmission or reception, otherwise the UL transmission has higher priority than the SL transmission or reception. If these conditions are not met, then the SL transmission or reception has higher priority than the UL transmission if the priority value of the SL transmission(s) or reception is smaller than sl-PriorityThreshold; otherwise, the UL transmission has higher priority than the SL transmission or reception.

Prioritization between SL receptions and SL transmissions (e.g., PSSCH) is not defined. The prioritization between SL receptions and transmissions may be up to UE implementation, by comparing the priorities, or hard coded in the UE such that SL transmissions always have priority or SL receptions always have priority.

The present disclosure relates to a configuration for a prioritization between SL and UL channels. In some instances, a UE may transmit SL and UL simultaneously in one component carrier (e.g., intra-band or inter-band carrier aggregation) or on different component carriers which may be in the same band or in different bands. A half-duplex UE may be configured to compare the following set of priorities, SL reception against SL transmission and UL. This means that a three-way comparison may be defined. For example, if a corresponding priority of a SL reception and a SL transmission are initially compared, and the winner (e.g., higher priority) is compared against UL, the SL reception may have a higher priority in comparison to the SL transmission, but have a lower priority in comparison to the UL. In such instance, only the UL may be transmitted. However, if all the channels are compared against each other, then the UE may be able to transmit both the UL and the SL.

In some instances, if a UE that is capable of transmitting UL and SL, and if the UE may either transmit or receive, the UE may compare the priority of the SL reception against the highest priority of the UL and SL transmission in order to determine whether to transmit or to receive. The UE may be configured to compare the SL reception, UL, and SL transmission by setting a threshold for quantizing the SL priorities. If the priority of the packet to be transmitted exceeds the threshold, then the value of the priority of the SL may be mapped to 1. If the priority of the packet to be transmitted does not exceed the threshold, then the value of the priority of the SL may be mapped to 0. The mapped value of the priority for the SL (e.g., SL reception or SL transmission) may then be compatible to be compared to the priority of the UL. With reference to diagram 500 and 510 of FIG. 5, the SL priority index lists the priority values of SL receptions and SL transmissions. The SL priority values range from 1 to 8 with the value of 1 being the highest priority. The UL priority values are shown in the Uu priority index, and the UL priority values are 1 or 0, with the value of 1 being the highest priority. The mapping of the priority values of the SL receptions and SL transmissions allows for the SL priorities to be compared against the SL priority. In some instances, the threshold for quantizing the SL priorities may be located between any adjacent two SL priority values of the SL priority values.

With the SL priority configured to be compared with the UL priority, the UE may compare the priorities to determine whether to transmit or receive. For example, the priorities of a first group of transmission signals (e.g., UL and SL transmission) may be compared by the UE to determine a first signal having a highest priority. The first signal with the highest priority may then be compared against a priority of a second signal from a second group of reception signals (e.g., SL reception) to determine whether to transmit the first signal or to receive a second signal from the second group of reception signals. The UE may transmit the first signal from the first group of transmission signals if the first signal has a higher priority than the second signal from the second group of reception signals. In some instances, the UE may transmit the UL and SL transmission if the priority of the first signal is higher than the SL reception. The UE may receive the second signal from the second group of reception signals if the second signal has a higher priority than the first signal from the first group of transmission signals. In some aspects, a similar approach may be adopted if a UE is configured to receive DL and SL, and transmit UL. In some aspects, a UE may be configured to operating in a full-duplex mode, such that the UE may transmit and receive simultaneously across some bands. In such instances, if a UE is transmitting UL in a first band (e.g., B1) and transmitting and receiving SL in a second band (e.g., B2), the UE is operating in full-duplex mode in B1-B2 combination. In instances where the UE is operating in full-duplex mode, the three-way comparison of priorities may not be utilized. In such instances, for a UE capable of full-duplex operation in some band combinations, a comparison of priorities may be performed across the transmissions and receptions that may not be performed simultaneously.

In some instances, for example, if the comparison of the priorities results in a tie, the UE may be configured to transmit UL and SL transmission or receive the SL reception as a fixed rule, as a configurable behavior, or as indicated by a base station via DCI or MAC-CE. In some aspects, a tie breaker may be based on other factors, such as but not limited to, the type of SL channel (e.g., PSSCH, PSFCH, or SSB), the type of UL channels (e.g., PUSCH or PUCCH), resource allocation mode for SL (e.g., Type 1 on one carrier and Mode 2 on another carrier), whether PSFCH is enabled or not, CBR (channel busy ratio) level associated with the resource pools in which transmission and reception should occur, zone identifier, cast type associated with transmission or reception, or a combination thereof.

In some aspects, if a UE is configured to transmit UL and SL, and if the UE can either transmit or receive, the UE may compare the priority of SL receptions against the highest priority of UL and SL transmission, to determine whether to transmit the highest priority of UL and SL transmission or to receive the SL reception. For example, the UL priority may be set to a configurable mapping, e.g., UL priority 0 may utilize a first mapping and the UL priority 1 may use a second mapping. The maximum of the value of the mapped UL priority compared against the priority of the SL transmission, may be compared against the priority of the SL reception. In the event of a tie, the UE may transmit UL and SL transmission or receive the SL reception as a fixed rule, as a configurable behavior, or as indicated via DCI or MAC-CE. A tie breaker may be based on other factors, such as but not limited to, a type of SL channel (e.g., PSSCH, PSFCH, or SSB), type of UL channels (e.g., PUSCH or PUCCH), resource allocation mode for SL (e.g., Type 1 used on one carrier and Mode 2 used on another carrier), whether PSFCH is enabled or not, CBR level associated with the resource pools in which transmission and reception occur, zone identifier, cast type associated with transmission or reception, or a combination thereof.

Figure 6:
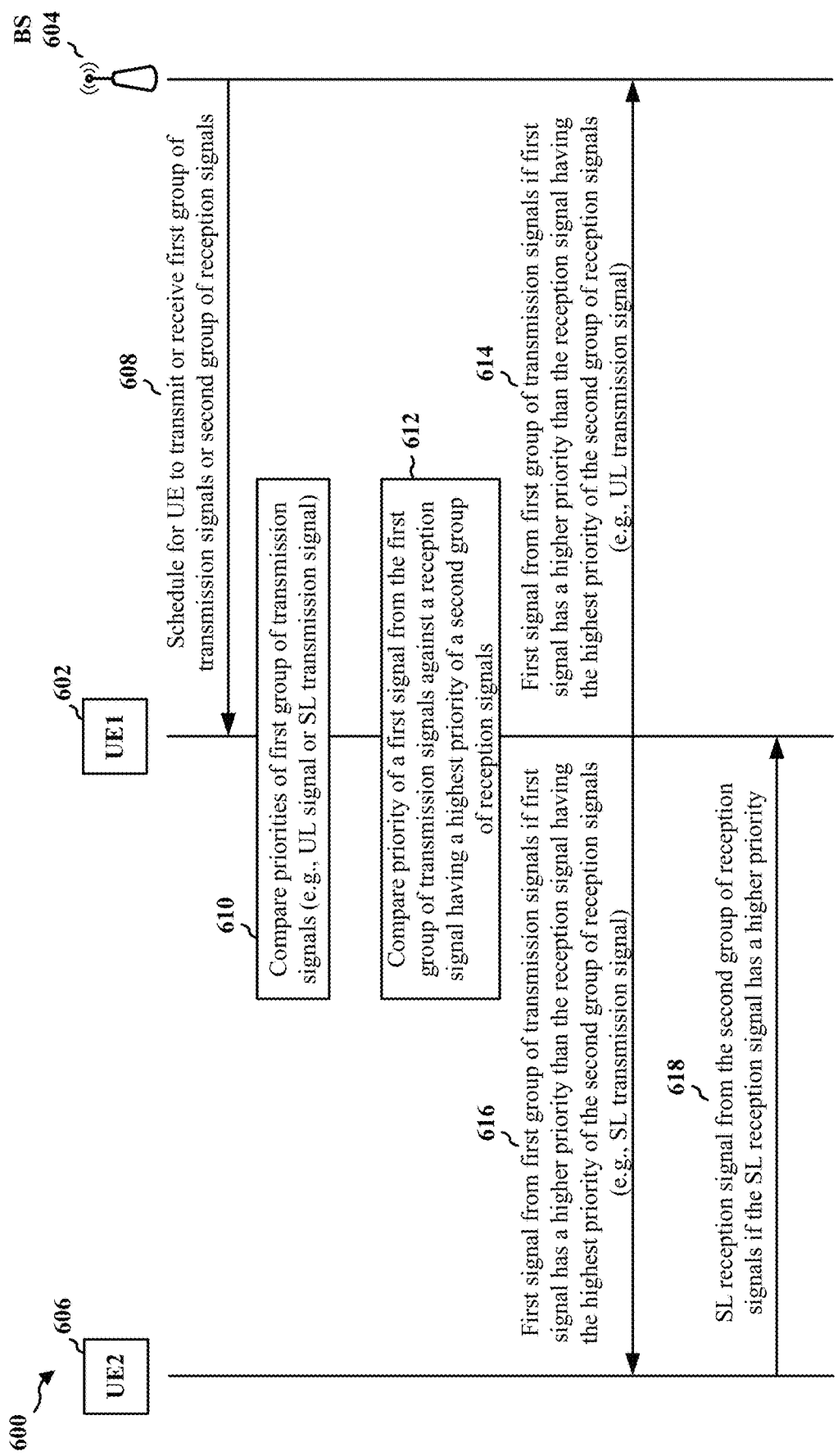
FIG. 6 is a call flow diagram of signaling between a first wireless device, a second wireless device, and a base station.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350.

As illustrated at 608, the base station 604 may transmit a schedule for a UE to transmit or receive a first group of transmission signals or a second group of reception signals. The base station may transmit the schedule to the UE. The UE may receive the schedule from the base station 608. The schedule may comprise priorities for each of the first group of transmission signals and the second group of reception signals.

As illustrated at 610, the UE 602 may compare priorities of a first group of transmission signals. The UE may compare the priorities of the first group of transmission signals to determine a first signal from the first group of transmission signals having a highest priority. The first group of transmission signals may comprise at least one uplink signal and at least one sidelink transmission signal As illustrated at 612, the UE 602 may compare a priority of the first signal from the first group of transmission signals against a reception signal having a highest priority of a second group of reception signals. The UE may compare the priority of the first signal from the first group of transmission signals against the priority of the second group of reception signals to determine to transmit at least the first signal from the first group of transmission signals or to receive at least one reception signal from the second group of reception signals. The second group of reception signals may comprise at least one sidelink reception signal. In some aspects, the at least one uplink signal and the at least one sidelink transmission signal may be transmitted if the priority of the first signal from the first group of transmission signals is equal to the priority of the reception signal having the highest priority of the second group of reception signals. In some aspects, the at least one sidelink reception signal may be received if the priority of the first signal from the first group of transmission signals is equal to the priority of the reception signal having the highest priority of the second group of reception signals. In some aspects, a tie of priorities may occur if the priority of the first signal from the first group of transmission signals is equal to the priority of the reception signal having the highest priority of the second group of reception signals. In such instances, a tie breaker may be based on at least one of a type of sidelink signal for transmission or reception, a type of uplink signal, a resource allocation mode for sidelink signals, whether a sidelink feedback channel is enabled, a channel busy ratio (CBR) level associated with resource pools in which transmission and reception occur, a zone identifier (ID), a cast type associated with transmission or reception, or a combination thereof. In some aspects, priorities for the at least one sidelink transmission signal and the at least one sidelink reception signal may be mapped to a value that is compatible with priority values for the at least one uplink signal, such that the respective priorities may be compared against each other. The priorities for the at least one sidelink transmission signal and the at least one sidelink reception signal may be quantized against a threshold. In some aspects, respective priorities for the at least one sidelink transmission signal and the at least one sidelink reception signal may be mapped to the value of 1 if quantized priorities for the at least one sidelink transmission signal and the at least one sidelink reception signal exceed the threshold, where the value of 1 denotes a highest priority. In some aspects, the respective priorities for the at least one sidelink transmission signal and the at least one sidelink reception signal may be mapped to the value of 0 if quantized priorities for the at least one sidelink transmission signal and the at least one sidelink reception signal do not exceed the threshold, where the value of 0 is a lower priority in comparison to the value of 1. In some aspects, the priority for the at least one uplink signal may be mapped to a value that is compatible with priority values of the at least one sidelink transmission signal or the at least one sidelink reception signal. In some aspects, the UE may be configured to operate in a full duplex (FD) mode.

A comparison of priorities may occur across transmissions and receptions that collide with each other. The comparison of priorities may resolve collisions between the transmissions and the receptions.

The UE 602 may transmit at least the first signal from the first group of transmission signals. The UE may transmit at least the first signal from the first group of transmission signals if the first signal from the first group of transmission signals has a higher priority than the reception signal having the highest priority of the second group of reception signals. The UE 602 may transmit the at least one uplink signal, as illustrated at 614, and the at least one sidelink transmission signal, as illustrated at 616. The UE may transmit the at least one uplink signal and the at least one sidelink transmission signal if the priority of the first signal is higher than the reception signal having the highest priority of the second group of reception signals. The UE 602 may transmit the at least one uplink signal to the base station 604. The UE 602 may transmit the at least one sidelink transmission signal to the second UE 606. The at least one uplink signal may comprise a plurality of uplink signals. The at least one uplink signal having a highest priority amongst the plurality of uplink signals may be transmitted. In some aspects, the at least one sidelink transmission signal may comprise a plurality of sidelink transmission signals. The at least one sidelink transmission signal having a highest priority amongst the plurality of sidelink transmission signals may be transmitted. In some aspects, the UE may transmit, to the base station, an indication indicating transmission of the first signal from the first group of transmission signals based on a prioritization procedure performed at the UE. The first group of transmission signals may comprise at least one uplink signal and at least one sidelink transmission signal. The indication may indicate transmission of the at least one uplink signal to the base station if a priority of the at least one uplink signal is higher than the priority of a reception signal having a highest priority of the second group of reception signals.

As illustrated at 618, the UE 602 may receive the at least one sidelink reception signal from the second group of reception signals. The UE may receive the at least one sidelink reception signal from the second group of reception signals if the priority of the reception signal of the second group of reception signals is higher than the first signal from the first group of transmission signals. The UE may receive the at least one sidelink reception signal from a second wireless device 606. In some aspects, the at least one sidelink reception signal may comprise a plurality of sidelink reception signals. The at least one sidelink reception signal having a highest priority amongst the plurality of sidelink reception signals may be received.

In some aspects, the base station 604 may receive an indication indicating transmission of a first signal from the first group of transmission signals. The base station may receive the indication from the UE 602. The base station may receive the indication indicating the transmission of the first signal from the first group of transmission signals based on a prioritization procedure performed at the UE 602. The first group of transmission signals may comprise at least one uplink signal and at least one sidelink transmission signal. In some aspects, the indication may indicate transmission of the at least one uplink signal to the base station if the priority of the at least one uplink signal is higher than the priority of the at least one sidelink reception signal. In some aspects, the at least one uplink signal may comprise a plurality of uplink signals. The at least one uplink signal having a highest priority amongst the plurality of uplink signals may be transmitted by the UE. In some aspects, the at least one uplink signal may be transmitted if the priority of the first signal from the first group of transmission signals is equal to the priority of the second group of reception signals.

Figure 7:
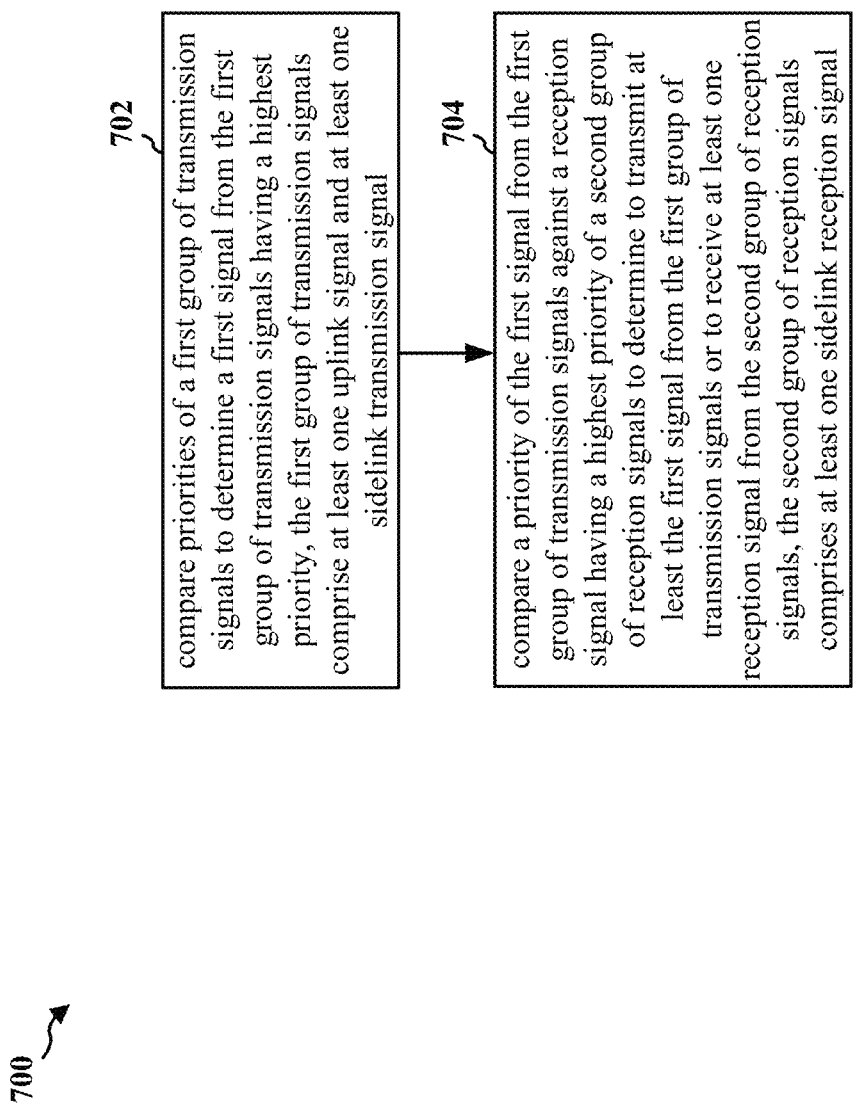
FIG. 7 is a flowchart of a method of wireless communication.

FIG. 7 is a flowchart 700 of a method of wireless communication. The method may be performed by a UE or a component of a UE (e.g., the UE 104, 402, 404, 602, 606; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow the UE to perform a prioritization procedure to determine to transmit or receive uplink or sidelink signals.

At 702, the UE may compare priorities of a first group of transmission signals. For example, 702 may be performed by comparison component 940 of apparatus 902. The UE may compare the priorities of the first group of transmission signals to determine a first signal from the first group of transmission signals having a highest priority. The first group of transmission signals may comprise at least one uplink signal and at least one sidelink transmission signal.

At 704, the UE may compare a priority of the first signal from the first group of transmission signals against a reception signal having a highest priority of a second group of reception signals. For example, 704 may be performed by comparison component 940 of apparatus 902. The UE may compare the priority of the first signal from the first group of transmission signals against the priority of the second group of reception signals to determine to transmit at least the first signal from the first group of transmission signals or to receive at least one reception signal from the second group of reception signals. The second group of reception signals may comprise at least one sidelink reception signal. In some aspects, the at least one uplink signal and the at least one sidelink transmission signal may be transmitted if the priority of the first signal from the first group of transmission signals is equal to the priority of the reception signal having the highest priority of the second group of reception signals. In some aspects, the at least one sidelink reception signal may be received if the priority of the first signal from the first group of transmission signals is equal to the priority of the reception signal having the highest priority of the second group of reception signals. In some aspects, a tie of priorities may occur if the priority of the first signal from the first group of transmission signals is equal to the priority of the reception signal having the highest priority of the second group of reception signals. In such instances, a tie breaker may be based on at least one of a type of sidelink signal for transmission or reception, a type of uplink signal, a resource allocation mode for sidelink signals, whether a sidelink feedback channel is enabled, a channel busy ratio (CBR) level associated with resource pools in which transmission and reception occur, a zone identifier (ID), a cast type associated with transmission or reception, or a combination thereof. In some aspects, priorities for the at least one sidelink transmission signal and the at least one sidelink reception signal may be mapped to a value that is compatible with priority values for the at least one uplink signal, such that the respective priorities may be compared against each other. The priorities for the at least one sidelink transmission signal and the at least one sidelink reception signal may be quantized against a threshold. In some aspects, respective priorities for the at least one sidelink transmission signal and the at least one sidelink reception signal may be mapped to the value of 1 if quantized priorities for the at least one sidelink transmission signal and the at least one sidelink reception signal exceed the threshold, where the value of 1 denotes a highest priority. In some aspects, the respective priorities for the at least one sidelink transmission signal and the at least one sidelink reception signal may be mapped to the value of 0 if quantized priorities for the at least one sidelink transmission signal and the at least one sidelink reception signal do not exceed the threshold, where the value of 0 is a lower priority in comparison to the value of 1. In some aspects, the priority for the at least one uplink signal may be mapped to a value that is compatible with priority values of the at least one sidelink transmission signal or the at least one sidelink reception signal. In some aspects, the UE may be configured to operate in a full duplex (FD) mode. A comparison of priorities may occur across transmissions and receptions that collide with each other. The comparison of priorities may resolve collisions between the transmissions and the receptions.

Figure 8:
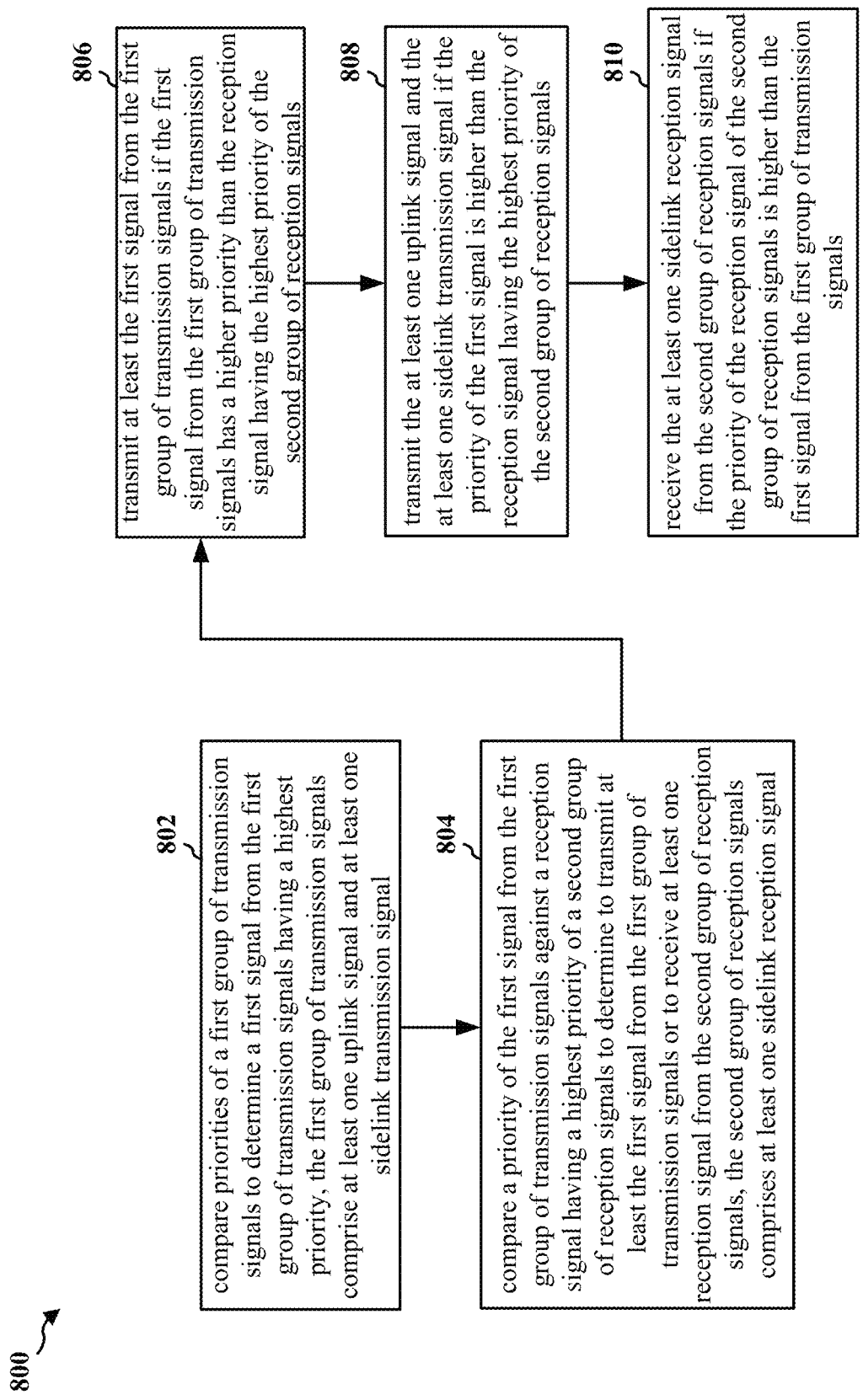
FIG. 8 is a flowchart of a method of wireless communication.

FIG. 8 is a flowchart 800 of a method of wireless communication. The method may be performed by a UE or a component of a UE (e.g., the UE 104, 402, 404, 602, 606; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow the UE to perform a prioritization procedure to determine to transmit or receive uplink or sidelink signals.

At 802, the UE may compare priorities of a first group of transmission signals. For example, 802 may be performed by comparison component 940 of apparatus 902. The UE may compare the priorities of the first group of transmission signals to determine a first signal from the first group of transmission signals having a highest priority. The first group of transmission signals may comprise at least one uplink signal and at least one sidelink transmission signal.

At 804, the UE may compare a priority of the first signal from the first group of transmission signals against a reception signal having a highest priority of a second group of reception signals. For example, 804 may be performed by comparison component 940 of apparatus 902. The UE may compare the priority of the first signal from the first group of transmission signals against the priority of the second group of reception signals to determine to transmit at least the first signal from the first group of transmission signals or to receive at least one reception signal from the second group of reception signals. The second group of reception signals may comprise at least one sidelink reception signal. In some aspects, the at least one uplink signal and the at least one sidelink transmission signal may be transmitted if the priority of the first signal from the first group of transmission signals is equal to the priority of the second group of reception signals. In some aspects, the at least one sidelink reception signal may be received if the priority of the first signal from the first group of transmission signals is equal to the priority of the second group of reception signals. In some aspects, a tie of priorities may occur if the priority of the first signal from the first group of transmission signals is equal to the priority of the second group of reception signals. In such instances, a tie breaker may be based on at least one of a type of sidelink signal for transmission or reception, a type of uplink signal, a resource allocation mode for sidelink signals, whether a sidelink feedback channel is enabled, a CBR level associated with resource pools in which transmission and reception occur, a zone ID, a cast type associated with transmission or reception, or a combination thereof. In some aspects, priorities for the at least one sidelink transmission signal and the at least one sidelink reception signal may be mapped to a value that is compatible with priority values for the at least one uplink signal, such that the respective priorities may be compared against each other. The priorities for the at least one sidelink transmission signal and the at least one sidelink reception signal may be quantized against a threshold. In some aspects, respective priorities for the at least one sidelink transmission signal and the at least one sidelink reception signal may be mapped to the value of 1 if quantized priorities for the at least one sidelink transmission signal and the at least one sidelink reception signal exceed the threshold, where the value of 1 denotes a highest priority. In some aspects, the respective priorities for the at least one sidelink transmission signal and the at least one sidelink reception signal may be mapped to the value of 0 if quantized priorities for the at least one sidelink transmission signal and the at least one sidelink reception signal do not exceed the threshold, where the value of 0 is a lower priority in comparison to the value of 1. In some aspects, the priority for the at least one uplink signal may be mapped to a value that is compatible with priority values of the at least one sidelink transmission signal or the at least one sidelink reception signal. In some aspects, the UE may be configured to operate in a full duplex (FD) mode. A comparison of priorities may occur across transmissions and receptions that collide with each other. The comparison of priorities may resolve collisions between the transmissions and the receptions.

At 806, the UE may transmit at least the first signal from the first group of transmission signals. For example, 806 may be performed by signal component 942 of apparatus 902. The UE may transmit at least the first signal from the first group of transmission signals if the first signal from the first group of transmission signals has a higher priority than the reception signal having the highest priority of the second group of reception signals.

At 808, the UE may transmit the at least one uplink signal and the at least one sidelink transmission signal. For example, 808 may be performed by signal component 942 of apparatus 902. The UE may transmit the at least one uplink signal and the at least one sidelink transmission signal if the priority of the first signal is higher than the reception signal having the highest priority of the second group of reception signals. The at least one uplink signal may comprise a plurality of uplink signals. The at least one uplink signal having a highest priority amongst the plurality of uplink signals may be transmitted. In some aspects, the at least one sidelink transmission signal may comprise a plurality of sidelink transmission signals. The at least one sidelink transmission signal having a highest priority amongst the plurality of sidelink transmission signals may be transmitted.

At 810, the UE may receive the at least one sidelink reception signal from the second group of reception signals. For example, 810 may be performed by signal component 942 of apparatus 902. The UE may receive the at least one sidelink reception signal from the second group of reception signals if the priority of the reception signal of the second group of reception signals is higher than the first signal from the first group of transmission signals. The UE may receive the at least one sidelink reception signal from a second wireless device. In some aspects, the at least one sidelink reception signal may comprise a plurality of sidelink reception signals. The at least one sidelink reception signal having a highest priority amongst the plurality of sidelink reception signals may be received.

Figure 9:
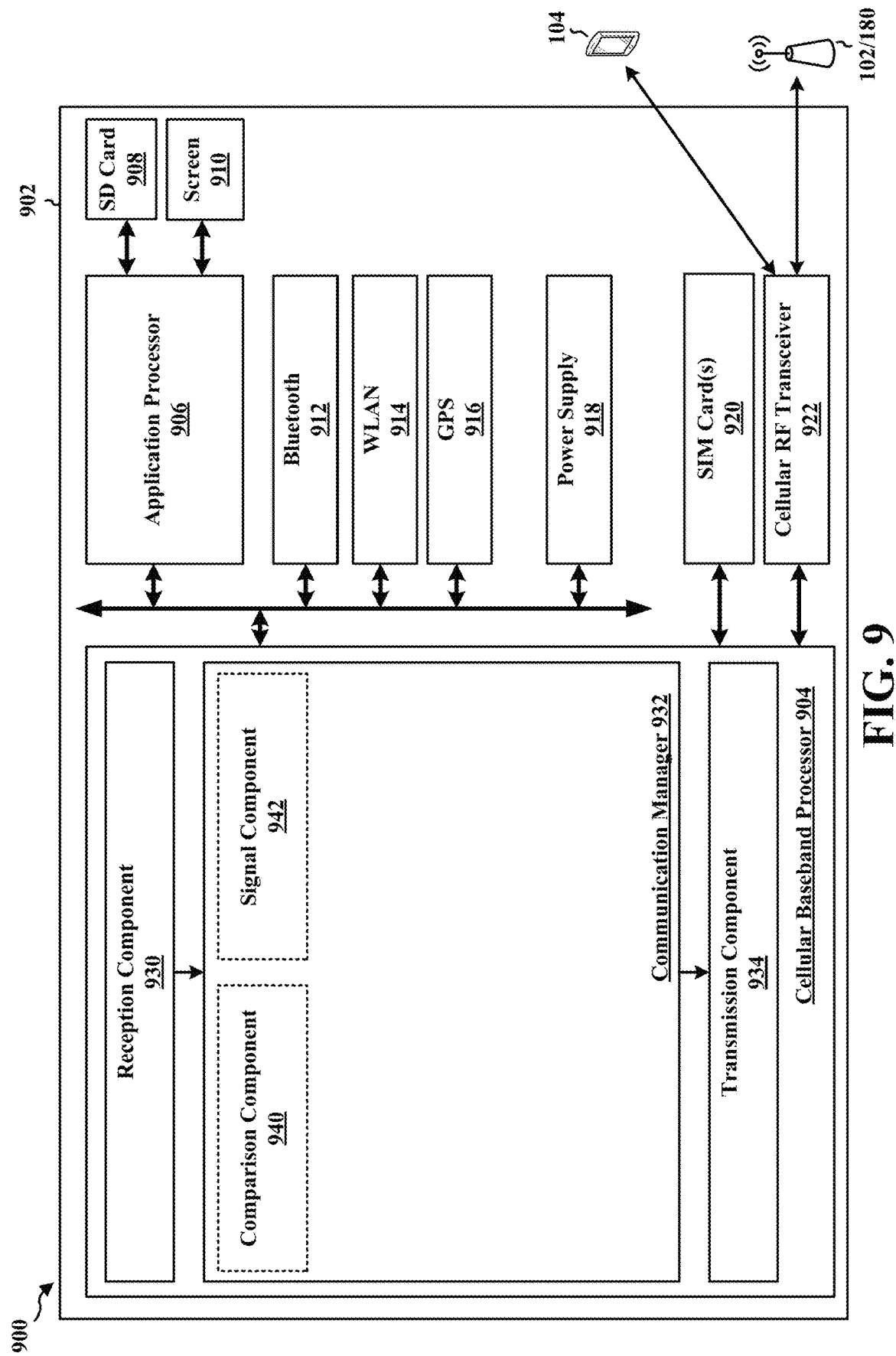
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a comparison component 940 that is configured to compare priorities of a first group of transmission signals, e.g., as described in connection with 702 of FIG. 7 or 802 of FIG. 8. The comparison component 940 may be configured to compare a priority of the first signal from the first group of transmission signals against a reception signal having a highest priority of a second group of reception signals, e.g., as described in connection with 704 of FIG. 7 or 804 of FIG. 8. The communication manager 932 further includes a signal component 942 that is configured to transmit at least the first signal from the first group of transmission signals, e.g., as described in connection with 806 of FIG. 8. The signal component 942 may be configured to transmit the at least one uplink signal and the at least one sidelink transmission signal, e.g., as described in connection with 808 of FIG. 8. The signal component 942 may be configured to receive the at least one sidelink reception signal from the second group of reception signals, e.g., as described in connection with 810 of FIG. 8.

The apparatus may include additional components that perform each of the blocks of the algorithm in the flowcharts of FIG. 7 or 8. As such, each block in the flowcharts of FIG. 7 or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for comparing priorities of a first group of transmission signals to determine a first signal from the first group of transmission signals having a highest priority. The first group of transmission signals comprise at least one uplink signal and at least one sidelink transmission signal. The apparatus includes means for comparing a priority of the first signal from the first group of transmission signals against a priority of a second group of reception signals to determine to transmit at least the first signal from the first group of transmission signals or to receive at least one reception signal from the second group of reception signals. The second group of reception signals comprises at least one sidelink reception signal. The apparatus further includes means for transmitting at least the first signal from the first group of transmission signals if the first signal from the first group of transmission signals has a higher priority than the priority of the at least one sidelink reception signal. The apparatus further includes means for transmitting the at least one uplink signal and the at least one sidelink transmission signal if the priority of the first signal is higher than the priority of the at least one sidelink reception signal. The apparatus further includes means for receiving the at least one sidelink reception signal from the second group of reception signals if the at least one sidelink reception signal has a higher priority than the first signal from the first group of transmission signals. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
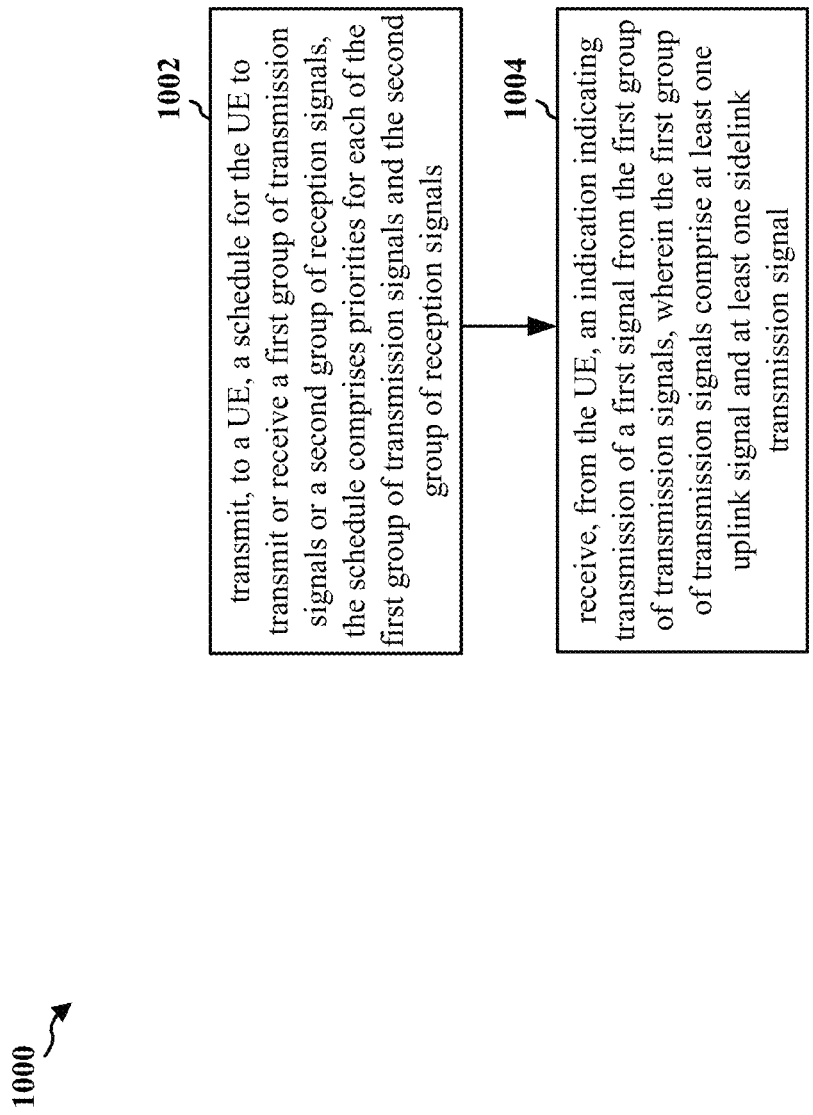
FIG. 10 is a flowchart of a method of wireless communication.

FIG. 10 is a flowchart 1000 of a method of wireless communication. The method may be performed by a base station or a component of a base station (e.g., the base station 102/180, 406, 604; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to receive an uplink signal from a UE based on a prioritization procedure performed at the UE.

At 1002, the base station may transmit a schedule for a UE to transmit or receive a first group of transmission signals or a second group of reception signals. For example, 1002 may be performed by schedule component 1140 of apparatus 1102. The base station may transmit the schedule to the UE. The schedule may comprise priorities for each of the first group of transmission signals and the second group of reception signals.

At 1004, the base station may receive an indication indicating transmission of a first signal from the first group of transmission signals. For example, 1004 may be performed by indication component 1142 of apparatus 1102. The base station may receive the indication from the UE. The base station may receive the indication indicating the transmission of the first signal from the first group of transmission signals based on a prioritization procedure performed at the UE. The first group of transmission signals may comprise at least one uplink signal and at least one sidelink transmission signal. In some aspects, the indication may indicate transmission of the at least one uplink signal to the base station if the priority of the at least one uplink signal is higher than the priority of a reception signal having a highest priority of the second group of reception signals. In some aspects, the at least one uplink signal may comprise a plurality of uplink signals. The at least one uplink signal having a highest priority amongst the plurality of uplink signals may be transmitted by the UE. In some aspects, the at least one uplink signal may be transmitted if the priority of the first signal from the first group of transmission signals is equal to the priority of the reception signal having the highest priority of the second group of reception signals.

Figure 11:
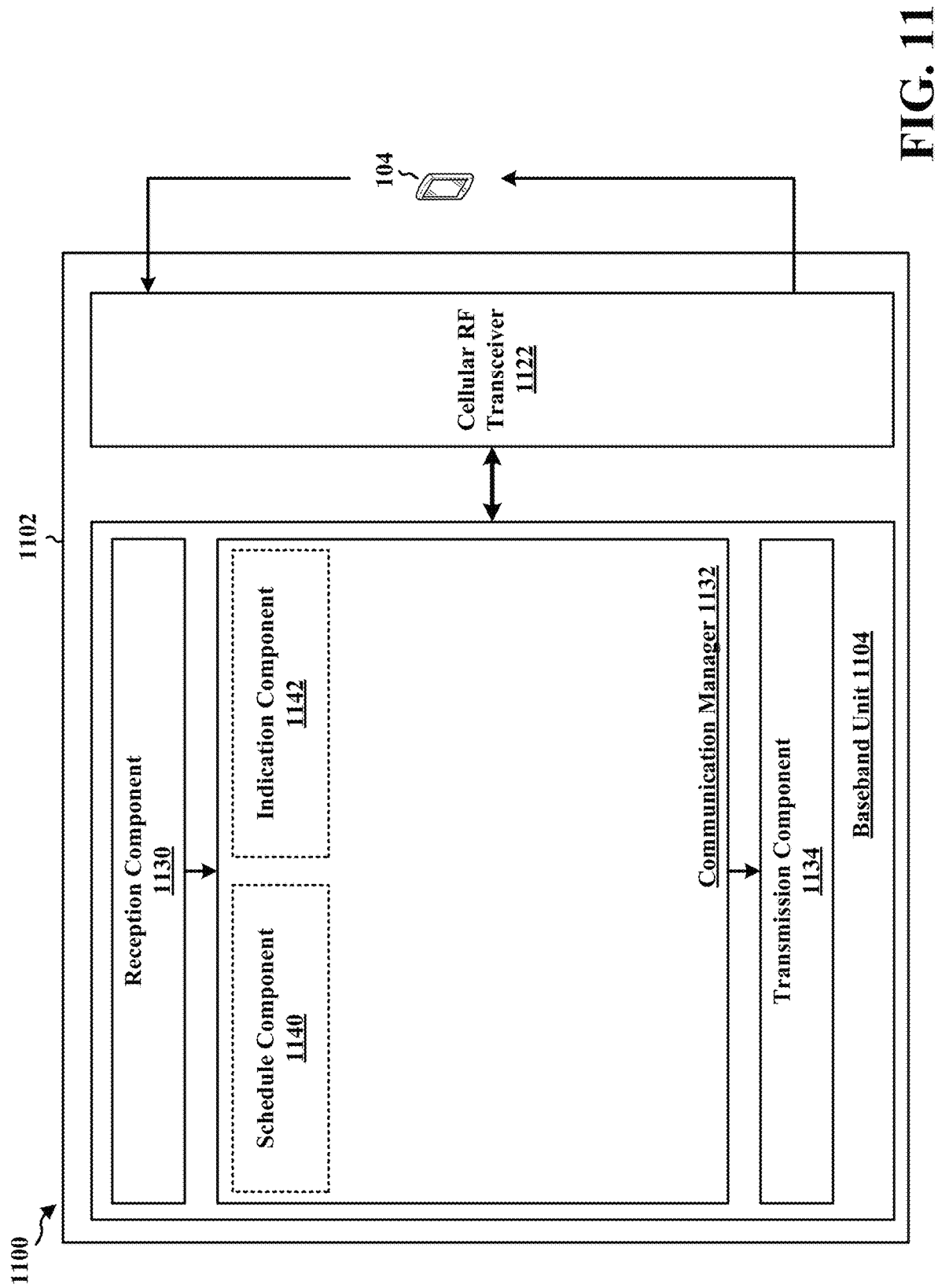
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a schedule component 1140 that may transmit a schedule for a UE to transmit or receive a first group of transmission signals or a second group of reception signals, e.g., as described in connection with 1002 of FIG. 10. The communication manager 1132 further includes an indication component 1142 that may receive an indication indicating transmission of a first signal from the first group of transmission signals, e.g., as described in connection with 1004 of FIG. 10.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a UE, a schedule for the UE to transmit or receive a first group of transmission signals or a second group of reception signals. The schedule comprises priorities for each of the first group of transmission signals and the second group of reception signals. The apparatus includes means for receiving, from the UE, an indication indicating transmission of a first signal from the first group of transmission signals based on a prioritization procedure performed at the UE. The first group of transmission signals comprise at least one uplink signal and at least one sidelink transmission signal. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," "A, B, or C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," "A, B, or C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory, the memory storing instructions executable by the at least one processor to cause the UE to compare priorities of a first group of transmission signals to determine a first signal from the first group of transmission signals having a highest priority, wherein the first group of transmission signals comprise at least one uplink signal and at least one sidelink transmission signal; and compare a priority of the first signal from the first group of transmission signals against a reception signal having a highest priority of a second group of reception signals to determine to transmit at least the first signal from the first group of transmission signals or to receive at least one reception signal from the second group of reception signals, wherein the second group of reception signals comprises at least one sidelink reception signal.

Aspect 2 is the apparatus of aspect 1, further including a transceiver coupled to the at least one processor.

Aspect 3 is the apparatus of any of aspects 1 and 2, further includes that the at least one processor is further configured to transmit at least the first signal from the first group of transmission signals if the first signal from the first group of transmission signals has a higher priority than the reception signal having the highest priority of the second group of reception signals.

Aspect 4 is the apparatus of any of aspects 1-3, further includes that the at least one processor is further configured to transmit the at least one uplink signal and the at least one sidelink transmission signal if the priority of the first signal is higher than the reception signal having the highest priority of the second group of reception signals.

Aspect 5 is the apparatus of any of aspects 1-4, further includes that the at least one uplink signal comprises a plurality of uplink signals, wherein the at least one uplink signal having a highest priority amongst the plurality of uplink signals is transmitted.

Aspect 6 is the apparatus of any of aspects 1-5, further includes that the at least one sidelink transmission signal comprises a plurality of sidelink transmission signals, wherein the at least one sidelink transmission signal having a highest priority amongst the plurality of sidelink transmission signals is transmitted.

Aspect 7 is the apparatus of any of aspects 1-6, further includes that the at least one processor is further configured to receive the at least one sidelink reception signal from the second group of reception signals if the priority of the reception signal of the second group of reception signals is higher than the first signal from the first group of transmission signals.

Aspect 8 is the apparatus of any of aspects 1-7, further includes that the at least one sidelink reception signal comprises a plurality of sidelink reception signals, wherein the at least one sidelink reception signal having a highest priority amongst the plurality of sidelink reception signals is received.

Aspect 9 is the apparatus of any of aspects 1-8, further includes that the at least one uplink signal and the at least one sidelink transmission signal are transmitted if the priority of the first signal from the first group of transmission signals is equal to the priority of the reception signal having the highest priority of the second group of reception signals.

Aspect 10 is the apparatus of any of aspects 1-9, further includes that the at least one sidelink reception signal is received if the priority of the first signal from the first group of transmission signals is equal to the priority of the reception signal having the highest priority of the second group of reception signals.

Aspect 11 is the apparatus of any of aspects 1-10, further includes that a tie of priorities occurs if the priority of the first signal from the first group of transmission signals is equal to the priority of the reception signal having the highest priority of the second group of reception signals, such that a tie breaker is based on at least one of a type of sidelink signal for transmission or reception, a type of uplink signal, a resource allocation mode for sidelink signals, whether a sidelink feedback channel is enabled, a CBR level associated with resource pools in which transmission and reception occur, a zone ID, a cast type associated with transmission or reception, or a combination thereof.

Aspect 12 is the apparatus of any of aspects 1-11, further includes that priorities for the at least one sidelink transmission signal and the at least one sidelink reception signal are mapped to a value that is compatible with priority values for the at least one uplink signal.

Aspect 13 is the apparatus of any of aspects 1-12, further includes that the priorities for the at least one sidelink transmission signal and the at least one sidelink reception signal are quantized against a threshold, wherein respective priorities for the at least one sidelink transmission signal and the at least one sidelink reception signal are mapped to the value of 1 if quantized priorities for the at least one sidelink transmission signal and the at least one sidelink reception signal exceed the threshold, wherein the respective priorities for the at least one sidelink transmission signal and the at least one sidelink reception signal are mapped to the value of 0 if quantized priorities for the at least one sidelink transmission signal and the at least one sidelink reception signal do not exceed the threshold.

Aspect 14 is the apparatus of any of aspects 1-13, further includes that the priority for the at least one uplink signal is mapped to a value that is compatible with priority values of the at least one sidelink transmission signal or the at least one sidelink reception signal.

Aspect 15 is the apparatus of any of aspects 1-14, further includes that the UE is configured to operate in a FD mode, wherein a comparison of priorities occurs across transmissions and receptions that collide with each other, wherein the comparison of priorities resolves collisions between the transmissions and the receptions.

Aspect 16 is a method of wireless communication for implementing any of aspects 1-15.

Aspect 17 is an apparatus for wireless communication including means for implementing any of aspects 1-15.

Aspect 18 is a computer-readable medium storing computer executable code, where the code when executed by a processor causes the processor to implement any of aspects 1-15.

Aspect 19 is an apparatus for wireless communication at a base station including at least one processor coupled to a memory, the memory storing instructions executable by the at least one processor to cause the base station to transmit, to a UE, a schedule for the UE to transmit or receive a first group of transmission signals or a second group of reception signals, wherein the schedule comprises priorities for each of the first group of transmission signals and the second group of reception signals; and receive, from the UE, an indication indicating transmission of a first signal from the first group of transmission signals based on a prioritization procedure performed at the UE, wherein the first group of transmission signals comprise at least one uplink signal and at least one sidelink transmission signal.

Aspect 20 is the apparatus of aspect 19, further including a transceiver coupled to the at least one processor.

Aspect 21 is the apparatus of any of aspects 19 and 20, further includes that the indication indicates transmission of the at least one uplink signal to the base station if a priority of the at least one uplink signal is higher than the priority of a reception signal having a highest priority of the second group of reception signals.

Aspect 22 is the apparatus of any of aspects 19-21, further includes that the at least one uplink signal comprises a plurality of uplink signals, wherein the at least one uplink signal having a highest priority amongst the plurality of uplink signals is transmitted by the UE.

Aspect 23 is the apparatus of any of aspects 19-22, further includes that the at least one uplink signal is transmitted if a priority of the first signal from the first group of transmission signals is equal to the priority of the reception signal having the highest priority of the second group of reception signals.

Aspect 24 is a method of wireless communication for implementing any of aspects 19-23.

Aspect 25 is an apparatus for wireless communication including means for implementing any of aspects 19-23.

Aspect 26 is a computer-readable medium storing computer executable code, where the code when executed by a processor causes the processor to implement any of aspects 19-23.

What is claimed is:

1. An apparatus for wireless communication at a user equipment (UE), comprising:
   memory; and
   at least one processor coupled to the memory, and based at least in part on information stored in the memory, the at least one processor, individually or in any combination, is configured to:
      compare priorities of a first group of transmission signals to determine a first signal from the first group of transmission signals having a highest priority, wherein the first group of transmission signals comprise at least one uplink signal associated with at least one uplink priority value and at least one sidelink transmission signal associated with at least one sidelink priority value;
      compare an uplink priority value of the first signal from the first group of transmission signals against a sidelink priority value of a reception signal having a highest priority of a second group of reception signals to determine to transmit at least the first signal from the first group of transmission signals or to receive at least one reception signal from the second group of reception signals, wherein the second group of reception signals comprises at least one sidelink reception signal; and
      transmit the at least one uplink signal and the at least one sidelink transmission signal if the uplink priority value of the first signal from the first group of transmission signals is equal to the sidelink priority value of the reception signal having the highest priority of the second group of reception signals;
      receive the at least one sidelink reception signal if the uplink priority value of the first signal from the first group of transmission signals is equal to the sidelink priority value of the reception signal having the highest priority of the second group of reception signals; or
      wherein a tie of priorities occurs if the uplink priority value of the first signal from the first group of transmission signals is equal to the sidelink priority value of the reception signal having the highest priority of the second group of reception signals, such that a tie breaker is based on at least one of a type of sidelink signal for transmission or reception, a type of uplink signal, a resource allocation mode for sidelink signals, whether a sidelink feedback channel is enabled, a channel busy ratio (CBR) level associated with resource pools in which transmission and reception occur, a zone identifier (ID), a cast type associated with transmission or reception, or a combination thereof.

2. The apparatus of claim 1, further comprising a transceiver coupled to the at least one processor.

3. The apparatus of claim 1, wherein the at least one processor is further configured to:
   transmit at least the first signal from the first group of transmission signals if the first signal from the first group of transmission signals has a higher priority than the reception signal having the highest priority of the second group of reception signals.

4. The apparatus of claim 3, wherein the at least one processor is further configured to:
   transmit the at least one uplink signal and the at least one sidelink transmission signal if the uplink priority value of the first signal is higher than sidelink priority value the reception signal having the highest priority of the second group of reception signals.

5. The apparatus of claim 4, wherein the at least one uplink signal comprises a plurality of uplink signals, and wherein to transmit the at least one uplink signal, the at least one processor is configured to transmit the at least one uplink signal having a highest priority amongst the plurality of uplink signals.

6. The apparatus of claim 4, wherein the at least one sidelink transmission signal comprises a plurality of sidelink transmission signals, and wherein to transmit the at least one uplink signal, the at least one processor is configured to transmit the at least one sidelink transmission signal having a highest priority amongst the plurality of sidelink transmission signals.

7. The apparatus of claim 1, wherein the at least one processor is further configured to:
   receive the at least one sidelink reception signal from the second group of reception signals if the sidelink priority value of the reception signal of the second group of reception signals is higher than the uplink priority value of the first signal from the first group of transmission signals.

8. The apparatus of claim 7, wherein the at least one sidelink reception signal comprises a plurality of sidelink reception signals, and wherein to receive the at least one sidelink reception signal, the at least one processor is configured to receive the at least one sidelink reception signal having a highest priority amongst the plurality of sidelink reception signals.

9. The apparatus of claim 1, wherein priority values for the at least one sidelink transmission signal and the at least one sidelink reception signal are mapped to a set of values that is compatible with the priority values for the at least one uplink signal.

10. The apparatus of claim 9, wherein the priority values for the at least one sidelink transmission signal and the at least one sidelink reception signal are quantized against a threshold,
 wherein respective priority values for the at least one sidelink transmission signal and the at least one sidelink reception signal are mapped to the value of 1 if quantized priority values for the at least one sidelink transmission signal and the at least one sidelink reception signal exceed the threshold,
 wherein the respective priority values for the at least one sidelink transmission signal and the at least one sidelink reception signal are mapped to the value of 0 if quantized priority values for the at least one sidelink transmission signal and the at least one sidelink reception signal do not exceed the threshold.

11. The apparatus of claim 1, wherein priority values for the at least one uplink signal is mapped to a set of values that is compatible with priority values of the at least one sidelink transmission signal or the at least one sidelink reception signal.

12. The apparatus of claim 1, wherein the UE is configured to operate in a full duplex (FD) mode, wherein a comparison of priorities occurs across transmissions and receptions that collide with each other, wherein the comparison of priorities resolves collisions between the transmissions and the receptions.

13. A method of wireless communication at a user equipment (UE), comprising:
 comparing priorities of a first group of transmission signals to determine a first signal from the first group of transmission signals having a highest priority, wherein the first group of transmission signals comprise at least one uplink signal associated with at least one uplink priority value and at least one sidelink transmission signal associated with at least one sidelink priority value;
 comparing an uplink priority value of the first signal from the first group of transmission signals against a sidelink priority value of a reception signal having a highest priority of a second group of reception signals to determine to transmit at least the first signal from the first group of transmission signals or to receive at least one reception signal from the second group of reception signals, wherein the second group of reception signals comprises at least one sidelink reception signal; and
 transmitting the at least one uplink signal and the at least one sidelink transmission signal if the priority of the first signal from the first group of transmission signals is equal to the priority of the reception signal having the highest priority of the second group of reception signals;
 receiving the at least one sidelink reception signal if the priority of the first signal from the first group of transmission signals is equal to the priority of the reception signal having the highest priority of the second group of reception signals; or
 wherein a tie of priorities occurs if the uplink priority value of the first signal from the first group of transmission signals is equal to the sidelink priority value of the reception signal having the highest priority of the second group of reception signals, such that a tie breaker is based on at least one of a type of sidelink signal for transmission or reception, a type of uplink signal, a resource allocation mode for sidelink signals, whether a sidelink feedback channel is enabled, a channel busy ratio (CBR) level associated with resource pools in which transmission and reception occur, a zone identifier (ID), a cast type associated with transmission or reception, or a combination thereof.

14. The method of claim 13, further comprising:
 transmitting at least the first signal from the first group of transmission signals if the first signal from the first group of transmission signals has a higher priority than the reception signal having the highest priority of the second group of reception signals.

15. The method of claim 14, further comprising:
 transmitting the at least one uplink signal and the at least one sidelink transmission signal if the uplink priority value of the first signal is higher than sidelink priority value the reception signal having the highest priority of the second group of reception signals.

16. The method of claim 13, further comprising:
 receiving the at least one sidelink reception signal from the second group of reception signals if the sidelink priority value of the reception signal of the second group of reception signals is higher than the uplink priority value of the first signal from the first group of transmission signals.

17. The method of claim 16, wherein the at least one sidelink reception signal comprises a plurality of sidelink reception signals, wherein the at least one sidelink reception signal having a highest priority amongst the plurality of sidelink reception signals is received.

18. The method of claim 13, wherein sidelink priority values for the at least one sidelink transmission signal and the at least one sidelink reception signal are mapped to a set of values that is compatible with uplink priority values for the at least one uplink signal.

19. An apparatus for wireless communication at a base station, comprising:
 a memory; and
 at least one processor coupled to the memory, the memory storing instructions executable by the at least one processor to cause the base station to:
  transmit, to a user equipment (UE), a schedule for the UE to transmit or receive a first group of transmission signals or a second group of reception signals, wherein the schedule comprises uplink priority values for each of the first group of transmission signals and sidelink priority values for the second group of reception signals; and
  receive, from the UE, an indication indicating transmission of a first signal from the first group of transmission signals based on a prioritization procedure performed at the UE, wherein the first group of transmission signals comprise at least one uplink signal and at least one sidelink transmission signal, wherein the indication further indicates mapping the sidelink priority values for the at least one sidelink transmission signal and the at least one sidelink reception signal to a set of values that is compatible with the uplink priority values for the at least one uplink signal.

20. The apparatus of claim 19, further comprising a transceiver coupled to the at least one processor.

21. The apparatus of claim 19, wherein the indication indicates transmission of the at least one uplink signal to the base station if a priority of the at least one uplink signal is higher than the priority of a reception signal having a highest priority of the second group of reception signals.

22. The apparatus of claim 21, wherein the at least one uplink signal comprises a plurality of uplink signals, wherein the at least one uplink signal having a highest priority amongst the plurality of uplink signals is transmitted by the UE.

23. The apparatus of claim 19, wherein the at least one uplink signal is transmitted if an uplink priority value of the first signal from the first group of transmission signals is equal to the sidelink priority value of the reception signal having a highest priority of the second group of reception signals.

24. A method of wireless communication at a base station, comprising:

transmitting, to a user equipment (UE), a schedule for the UE to transmit or receive a first group of transmission signals or a second group of reception signals, wherein the schedule comprises uplink priority values for each of the first group of transmission signals and sidelink priority values for the second group of reception signals; and receiving, from the UE, an indication indicating transmission of a first signal from the first group of transmission signals based on a prioritization procedure performed at the UE, wherein the first group of transmission signals comprise at least one uplink signal and at least one sidelink transmission signal, wherein the indication further indicates mapping the sidelink priority values for the at least one sidelink transmission signal and the at least one sidelink reception signal to a set of values that is compatible with the uplink priority values for the at least one uplink signal.

25. The method of claim 24, wherein the indication indicates transmission of the at least one uplink signal to the base station if an uplink priority value of the at least one uplink signal is higher than an uplink priority value of a reception signal having a highest priority of the second group of reception signals.

* * * * *